United States Patent
Kim

(10) Patent No.: US 6,320,949 B1
(45) Date of Patent: Nov. 20, 2001

(54) METHOD FOR DUPLICATING CALLS OF REMOTE MULTIPLE SUBSCRIBERS

(75) Inventor: Young-Hwi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/080,680

(22) Filed: May 18, 1998

(30) Foreign Application Priority Data

May 19, 1997 (KR) ................................. 97-19226

(51) Int. Cl.⁷ ............................. H04M 3/42; G05B 19/18
(52) U.S. Cl. ..................... 379/201.01; 379/279; 700/2; 700/4
(58) Field of Search ......................... 379/201.01–201.12, 379/207.01–207.16, 219, 220.01, 221.01–221.15, 230, 279; 370/278, 282, 294, 312, 313, 326, 327, 360, 376; 700/1–7

(56) References Cited

U.S. PATENT DOCUMENTS

| | | | |
|---|---|---|---|
| 4,127,742 | * 11/1978 | Couturier et al. | 370/376 |
| 4,698,805 | * 10/1987 | Sasuta et al. | 370/327 |
| 4,805,166 | * 2/1989 | Ardon et al. | 370/360 |
| 4,942,602 | * 7/1990 | Baker, Jr. et al. | 379/212 |
| 4,949,373 | * 8/1990 | Baker, Jr. et al. | 379/93.23 |
| 5,291,609 | * 3/1994 | Herz | 710/52 |
| 5,838,698 | * 11/1998 | Doubler et al. | 714/800 |
| 5,912,888 | * 6/1999 | Walsh et al. | 370/355 |
| 5,959,659 | * 9/1999 | Dokie | 348/7 |
| 5,974,114 | * 10/1999 | Blum et al. | 379/9 |

* cited by examiner

Primary Examiner—Harry S. Hong
Assistant Examiner—Benny Q. Tieu
(74) Attorney, Agent, or Firm—Dilworth & Barrese, LLP

(57) ABSTRACT

A method and apparatus for duplicating a call of a remote subscriber system having an active processor and a standby processor. The method includes the steps of: checking whether a call is generated from a subscriber under a normal duplication state of each of the active and standby processors; if the call is generated, transmitting a subscriber number and a voice channel number of a talk state to the standby processor; storing the subscriber number and voice channel number in a working area and connecting a port corresponding to the subscriber number and voice channel number to a time switch of the standby processor; if the call is not generated, checking whether the call is completed; and if the call is completed, transmitting a subscriber number and a voice channel number of a call release state to the standby processor and disconnecting the time switch from the port corresponding to the voice channel number and the subscriber number of the talk state.

10 Claims, 5 Drawing Sheets

METHOD FOR DUPLICATING CALLS OF REMOTE MULTIPLE SUBSCRIBERS

BACKGROUND OF THE INVENTION

1. Field of the Invention

The present invention relates to a call processing method of a switching system, and more particularly, to a method for duplicating calls of remote multiple subscribers.

2. Description of the Related Art

In general, a switching system has a module for managing subscribers therein. Since the module is situated within a subscriber card, the subscribers have been managed by requesting and storing a database related to the subscribers by use of a communication channel within the system. That is, the subscribers have been managed in the interior of the switching system. However, it is expensive to install the system for remote subscribers, especially in systems with less than 512 subscribers. The cost may be reduced by independently separating only the subscriber module and managing the subscribers. However, if calls of the remote subscribers are managed by an additional processor, the system becomes unstable.

SUMMARY OF THE INVENTION

It is therefore an object of the present invention to provide a method for stabilizing a switching system by duplicating calls of remote subscribers.

According to one feature of the present invention, a method for duplicating a call of a remote subscriber system having an active processor and a standby processor, includes the steps of: checking whether a call is generated from a subscriber under a normal duplication state of each of the active and standby processors; if the call is generated, transmitting a subscriber number and a voice channel number of a talk state to the standby processor; storing the subscriber number and voice channel number in a working area and connecting a port corresponding to the subscriber number and voice channel number to a time switch of the standby processor; if the call is not generated, checking whether the call is completed; and if the call is completed, transmitting a subscriber number and a voice channel number of a call release state to the standby processor and disconnecting the time switch from the port corresponding to the B channel number and the subscriber number of the talk state.

In accordance with one form of the present invention, a remote subscriber system is defined which operates in one of a talk state and a release state. The remote subscriber system includes an active processor. The active processor provides a first signal when a call is generated (talk state) and provides a second signal when the call is terminated (release state). The remote subscriber system further includes a standby processor having a plurality of ports. The standby processor is responsive to the active processor and connects one of the ports in response to the first signal and disconnects the port in response to the second signal. Preferably, the first signal and second signal include a subscriber number and a voice channel number associated with the call.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
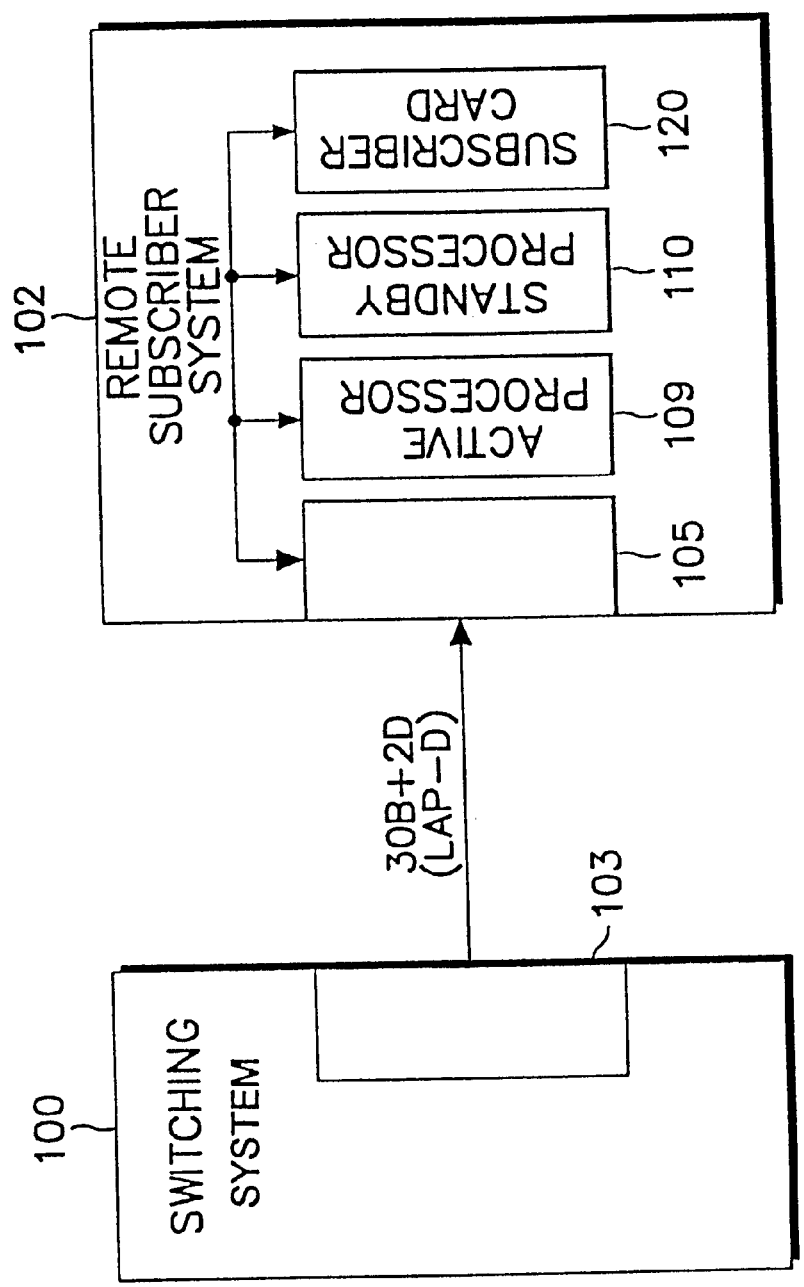
FIG. 1 is a block diagram of a switching system and a remote subscriber system applied to the present invention.

In the explanation of the drawings, like reference numerals are used to designate like elements. Moreover, well known functions or constructions have not been described so as not to obscure the present invention. The following terms are defined in consideration of the function of the present invention and may vary according to a chip designer's intention or custom. Therefore, their definition should be based on the overall contents of the specification.

Referring to FIG. 1, a system overview is depicted where a switching system 100 is connected to a remote subscriber system 102. Preferably, the switching system 100 communicates with the remote subscriber system 102 using the LAP-D protocol over a bus structure of 30B+2D lines between the link card 103 of the switching system 100 and the link card 105 of the remote subscriber system 102. The remote subscriber system 102 includes an active processor 109 and a standby processor 110. D channel data applied to the link card 103 of the switching system 100 is connected to the active processor 109 of the remote subscriber system 102. The active processor 109 controls all boards of the remote subscriber system 102.

Figure 2:
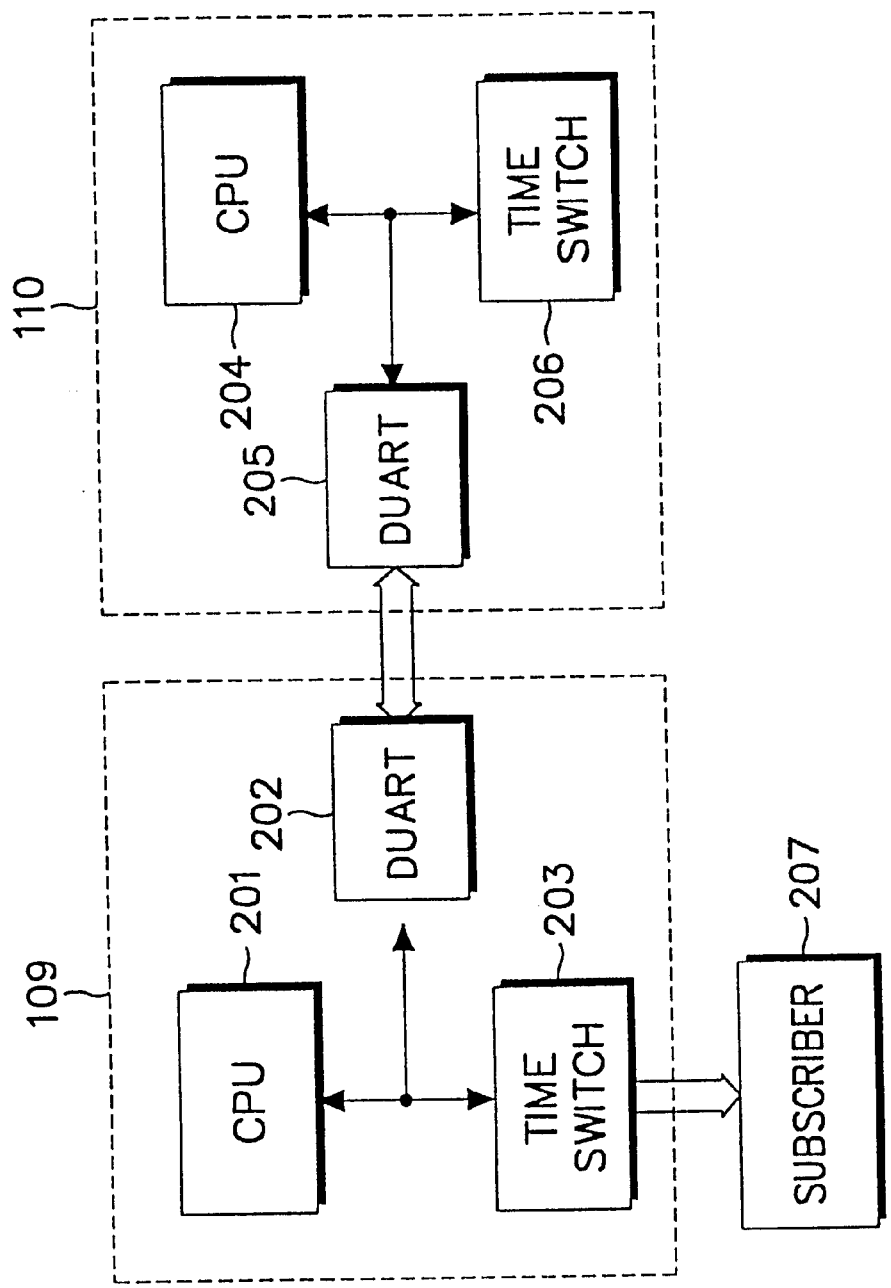
FIG. 2 is a block diagram illustrating the internal construction of an active processor and a standby processor shown in FIG. 1.

Referring to FIG. 2, the active processor 109 and the standby processor 110 each have respective central processing units (CPUs) 201 and 204. The active processor 109 is connected to the standby processor 110 by respective DUARTs (Dual Universal Asynchronous Receivers-Transmitters) 202 and 205. Both the active processor and standby processor 110 include a time switch 203, 206, respectively.

Figure 3:
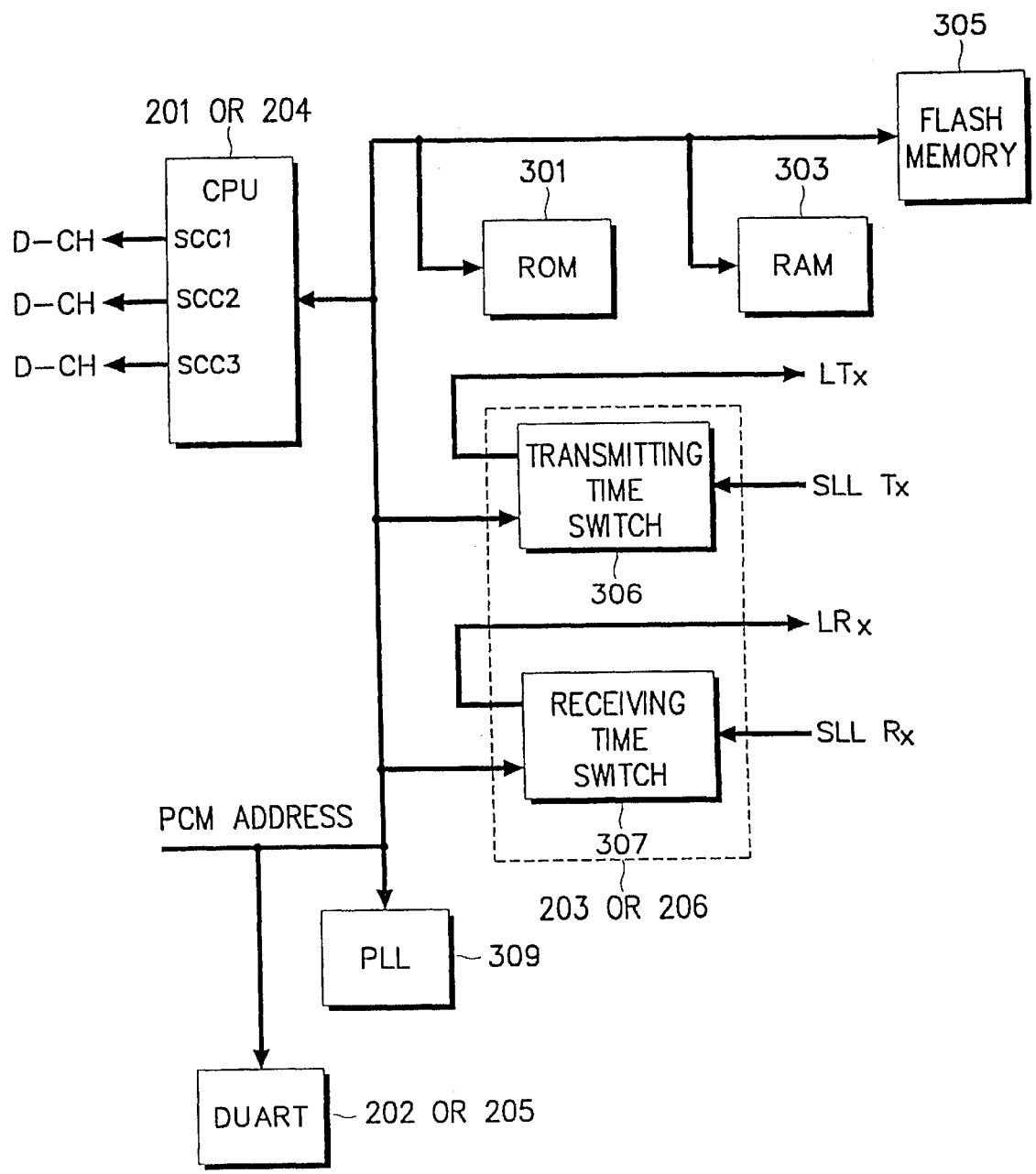
FIG. 3 is a block diagram illustrating the connection relationship between elements constituting the active processor or the standby processor of FIG. 2.

The internal construction of the active processor 109 is the same as that of the standby processor 110, which is further illustrated in FIG. 3. Each time switch 202, 206 includes a transmitting time switch 306 and a receiving time switch 307. The transmitting time switch 306 is interposed between at least one subscriber transmitter (SLL Tx) and at least one link transmitter (LTx). Similarly, the receiving time switch is interposed between at least one subscriber receiver (SLL Rx) and at least one link receiver (LRx). For duplication control processing through the CPU 201, 204 control programs and data are stored in a read only memory (ROM) 301, a random access memory (RAM) 303 and a flash memory 305. Each of the active processor 109 and standby processor 110 also include a phase lock loop (PLL) 309. Preferably, the PLL 309 receives an 8 KHZ frame pulse signal provided by a link receiver (LRx) which is passed to the PLL 309 via the receiving time switch 307. In response, the PLL 309 provides a locking signal which is substantially synchronous to the frame pulse signal.

In a preferred embodiment, the CPUs 201,204 are a 68302-type microprocessor manufactured by MOTOROLA Co. The time switches 203, 206 include an integrated circuit chip, model number SMS-9303 manufactured by SAMSUNG ELECTRONICS Co. The DUARTs 202, 205 are preferably an integrated circuit chip, model number MC 68681, manufactured by MOTOROLA Co. The PLL 309 is preferably a T1 digital trunk phase lock loop integrated circuit, such as model number MT8940 manufactured by MITEL. These component selections are merely exemplary and those skilled in the art will readily appreciate that other components having equivalent function and performance characteristics can be substituted to achieve equivalent results.

Figure 4:
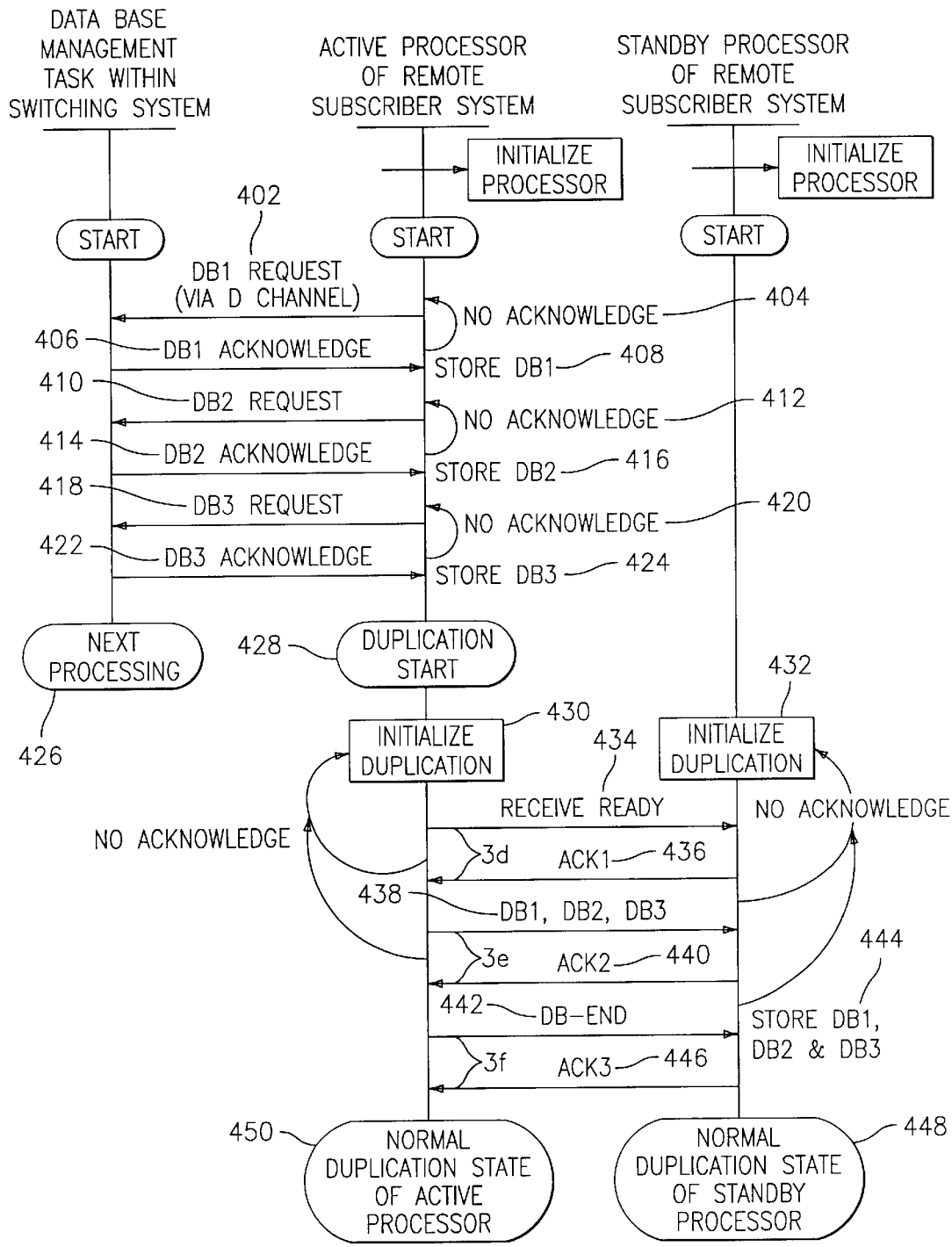
FIG. 4 is a flow chart illustrating a duplication process between the active processor and the standby processor of the remote subscriber system and an initialization process between the switching system and the remote subscriber system.

FIG. 4 is a flow chart illustrating an initialization process between the switching system 100 and the remote subscriber system 102 as well as a duplication process between the active processor 109 and the standby processor 110 of the remote subscriber system 102. Information related to the system is contained in a plurality of database structures stored in the switching system 100. During initialization of the active processor 109 of the remote subscriber system 102, several of these databases are transferred from the switching system 100 to the remote subscriber system 102. To effect the transfer, the active processor 109 of the remote subscriber system 102 transmits a request message to a database management task within the switching system 100 to begin the transfer of a first database, such as a tone related database (DB1) (step 402). The active processor 109 then waits for a predetermined time for an acknowledge message. If there is no acknowledge message (step 404), the database DB1 is again requested. If the acknowledge message is received (step 406), the active processor 109 stores the database DB1 (step 408).

Next, the active processor 109 transmits a request message (step 410) to the database management task requesting in transfer of a second database, such as a subscriber type database (DB2). The active processor 109 then waits for a predetermined time for an acknowledge message. If there is no acknowledge message (step 412), the database DB2 is again requested. If the acknowledge message is received (step 414), the active processor 109 receives and stores the database DB2 (step 416). Thereafter, the active processor 109 transmits a request message (step 418) to the database management task requesting transfer of a third database, such as a parameter (for example, a hook-on type or hook-off type) related database (DB3). The active processor 109 then waits for a predetermined time for an acknowledge message. If there is no acknowledge message (step 420), the database DB3 is again requested. If the acknowledge message is received (step 422), the active processor 109 receives and stores the database DB3 (step 424). When the transfer of all required databases is complete, the data base management task within the switching system 100 advances to a next processing task (step 426).

After the required database structures are stored by the active processor 109, a duplication process is implemented between the active processor 109 and the standby processor 110 (step 428). The first step in the duplication process is to initialize both the the active processor 109 and the standby processor 10 (steps 430, 432 respectively). After initialization, the active processor 109 transmits a ready-to-receive inquiry message to the standby processor 110 (step 434). If an acknowledge message ACK1 is received from the standby processor 110 (step 436), the active processor 109 increases a buffer pointer by the message size of a message and transmits the databases DB1, DB2 and DB3 to the standby processor 110 (step 438). The standby processor 110 temporarily stores the databases DB1, DB2 and DB3, increases a buffer pointer by an amount indicative of the received message size and generates an acknowledgment signal, ACK2 (step 440).

If an acknowledge signal ACK2 is received from the standby processor 110, the active processor 109 transmits a database end signal DB-END to the standby processor 110 (step 442). Upon receipt of the DB-END signal, the standby processor 110 stores the databases DB1, DB2 and DB3 (step 444) and transmits an acknowledge signal ACK3 to the active processor 109 (step 446). After transmission of the ACK3 signal, the standby processor 110 returns to a normal duplication state (step 448). Upon receipt of the ACK3 signal, the active processor 109 also enters a normal duplication state (step 450). If during the operation of steps 430 through 450, either the active processor 109 or standby processor 110 fail to receive any expected acknowledgment signal (ACK1, ACK2 or ACK3), the program is then routed back to the initialization steps (430, 432).

Figure 5:
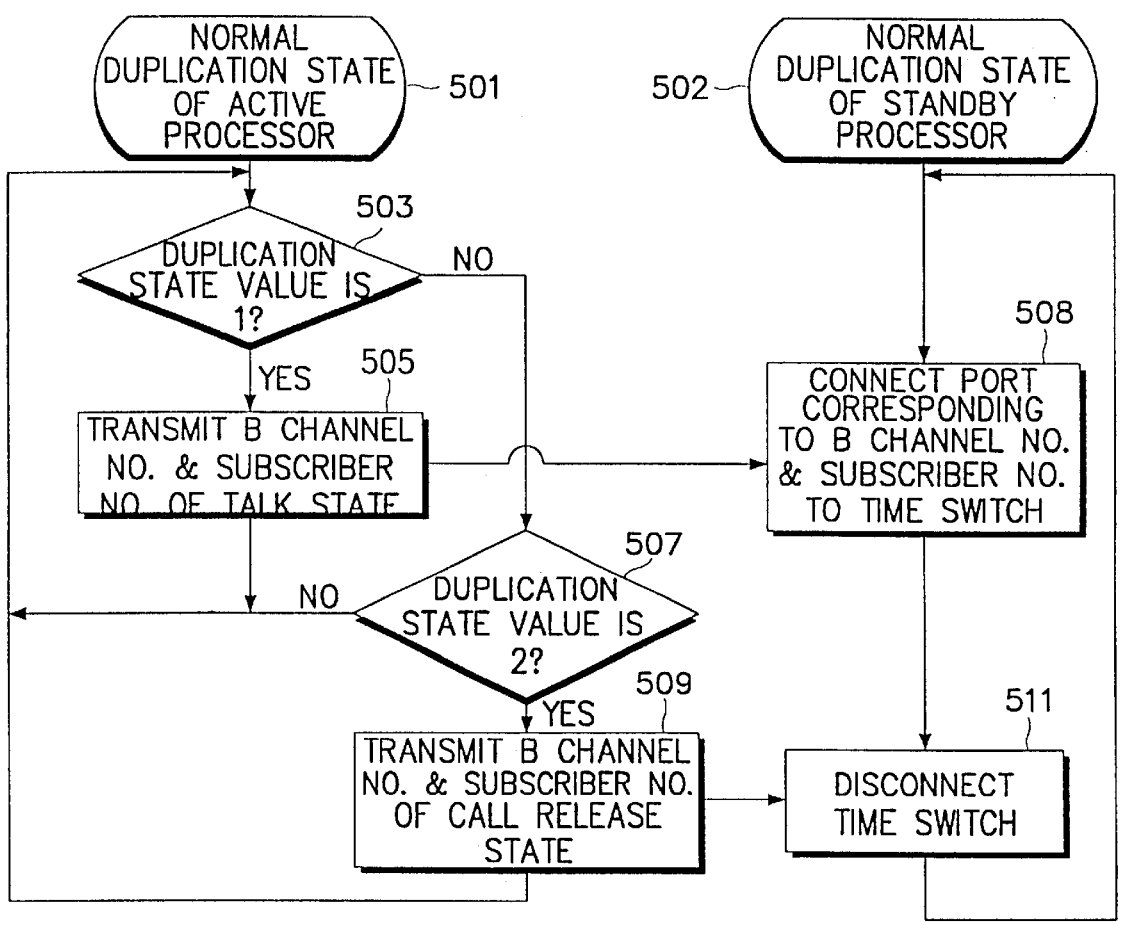
FIG. 5 is a flow chart illustrating a duplication process when the remote subscriber system generates a call.

In addition to the database duplication process just described, the present invention also performs a call duplication process to generate a redundant channel for a call. FIG. 5 illustrates one embodiment of such a duplication process, which is performed when the remote subscriber system 102 processes a call. To perform the method of FIG. 5, the active processor 109 and the standby processor 110 each use a portion of RAM 303 as a subscriber working area.

The flow chart of FIG. 5 illustrates the operation of both the active processor 109 and the standby processor 110 during their respective normal duplication states. During this operation, the processors 109, 110 will be in either the "talk state," meaning a call is in progress, or in a "release state," which is indicative of a call being completed. The particular state of the system is reflected in a subscriber duplication state value. When a call is generated from a subscriber, a subscriber duplication state value is set to one (1) by the switching system 100. When a call is terminated, the subscriber duplication state will be set to a value of two (2) by the switching system 100.

The active processor 109 performs a continuous test of the duplication state value to determine the system status. Beginning at step 503, the active processor 109 checks whether the subscriber duplication state value is equal to one (1). If so, the active processor 109 responds to the "talk state" by transmitting a voice channel (B channel) number and subscriber number of the call to the standby processor 110 (step 505). After transmitting the channel numbers to the standby processor 110, the active processor 109 returns to step 503.

The standby processor 110 responds to the "talk state" channel number information by connecting a port, corresponding to the voice channel number and subscriber number, to its associated time switch 206 (step 508). This duplicates the current call in a redundant channel. The standby processor 110 maintains this port connection for the duration of the talk state.

If at step 503 the duplication state value is not equal to 1, the active processor 109 advances to step 507. As stated previously, when a call is completed or disconnected, the subscriber duplication state value is set to a value of two (2). Accordingly, if at step 507 the subscriber duplication state value is equal to two (2), the active processor 109 recognizes the "release state" and transmits the subscriber number and the voice channel number of the terminated call to the standby processor 110 (step 509). After providing the release state information to the standby processor 110, the active processor 109 returns program control to step 503 where testing of the subscriber duplication state value is repeated, awaiting initiation of another call.

In response to the receipt of the release state information, the standby processor 110 disconnects the time switch 206 from the port corresponding to the voice channel number and subscriber number of the talk state (step 511). The standby processor then enters a wait state until a new talk state is initiated by the active processor 109.

As described above, since the remote subscriber system is duplicated, the reliability and stability of the system can be improved. Further, it is possible to apply the duplication system to other subscriber modules.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for duplicating a call having an associated subscriber number and voice channel number in a remote subscriber system having an active processor and a standby processor, comprising the steps of:

transmitting the subscriber number and the voice channel number from the active processor to the standby processor when a call is generated, thereby indicating a talk state;

connecting a port associated with the standby processor in accordance with the subscriber number and the voice channel number;

transmitting the subscriber number and the voice channel number from the active processor to the standby processor when the call is terminated, thereby indicating a release state; and disconnecting said associated port.

2. The method of duplicating a call as defined by claim 1, wherein the further step of storing the subscriber number and voice channel number is performed between said transmitting and said connecting steps.

3. A method for duplicating a call of a remote subscriber system having an active processor and a standby processor, comprising the steps of:

checking whether a call is generated from a subscriber under a normal duplication state of each of said active and standby processors;

if the call is generated, transmitting a subscriber number and a voice channel number of a talk state to said standby processor;

storing said subscriber number and voice channel number in a working area and connecting a port corresponding to the subscriber number and voice channel number to a time switch of said standby processor;

checking whether the call is completed; and if the call is completed, transmitting a subscriber number and a voice channel number of a call release state to said standby processor and disconnecting said time switch from the port corresponding to the voice channel number and the subscriber number of the talk state.

4. A remote subscriber system having a talk state and a release state and duplicating a call in response to the call state, the remote subscriber system comprising:

an active processor, said active processor providing a first signal when a call is generated and providing a second signal when the call is terminated;

a standby processor including a plurality of ports, said standby processor being responsive to the active processor and connecting one of said plurality of ports in response to the first signal and disconnecting said port in response to the second signal.

5. The remote subscriber system as defined by claim 4, wherein each of the first signal and second signal includes a voice channel number and a subscriber number associated with a call and wherein said port is selected in accordance with said voice channel number and said subscriber number.

6. The remote subscriber system as defined by claim 5, wherein the standby processor further comprises:

a central processing unit;

a time switch responsive to said central processing unit, said plurality of ports being associated with said time switch; and a dual universal asynchronous receiver/transmitter (DUART), said DUART being operatively coupled to said central processing unit, said standby processor communicating with said active processor via said DUART.

7. A remote subscriber system having a talk state and a release state and duplicating a call in response to a call state, the remote subscriber system comprising:

means for determining that a call is initiated in a first port;

means for duplicating the call by connecting a second port when the call is initiated;

means for determining that the call is terminated; and means for disconnecting the second port when the call is terminated.

8. A remote subscriber system as defined by claim 7, wherein the call includes an associated voice channel number and subscriber number and said means for duplicating the call includes a plurality of ports, said second port being one of said plurality of ports which is selected in accordance with said voice channel number and subscriber number.

9. A remote subscriber system as defined by claim 8, wherein said means for determining includes an active processor and said means for duplicating includes a standby processor.

10. The remote subscriber system as defined by claim 9, wherein:

the active processor further comprises:
   a first central processing unit;
   a first time switch responsive to said first central processing unit; and
   a first dual universal asynchronous receiver/transmitter (DUART), said first DUART being operatively coupled to said first central processing unit, said active processor communicating with said standby processor via said first DUART; and wherein the standby processor further comprises:
   a second central processing unit;
   a second time switch responsive to said second central processing unit, said plurality of ports being associated with said time switch; and
   a second dual universal asynchronous receiver/transmitter (DUART), said second DUART being operatively coupled to said central processing unit, said standby processor communicating with said active processor via said second DUART.

\* \* \* \* \*